Aug. 23, 1960  R. H. REHDER  2,950,456
ELECTRIC BUS CONSTRUCTION
Filed June 16, 1959

Inventor:
Robert H. Rehder,
by William Freedman
His Attorney.

United States Patent Office 2,950,456
Patented Aug. 23, 1960

2,950,456

ELECTRIC BUS CONSTRUCTION

Robert H. Rehder, Peterborough, Ontario, Canada, assignor to Canadian General Electric Company, Limited, Toronto, Ontario, Canada Filed June 16, 1959, Ser. No. 820,626

Claims priority, application Canada Jan. 27, 1959

6 Claims. (Cl. 339—22)

This invention relates to an electric bus construction, and particularly to an improved method of interconnecting adjacent series-related sections of tubular shaped electric bus, and to means of providing bar take-off from such bus.

For many applications, tubular, or generally cylindrical, bus has come into wide use in preference to bars of rectangular cross section because of its rigidity, higher current-carrying capacity for a given cross-sectional area, higher impulse standing and corona starting voltages, and lower cost slip-on type of insulation.

The disadvantages, however, have been the higher cost and greater bulk of joints and bar take-offs for individual feeders. Previously, expensive cast connectors were employed or else the tubes were flattened where the joint was to be made.

It is an object of my invention to provide an improved, simple, compact and rugged tubular bus bar connection which is readily assembled or disassembled.

A further object of the invention is to provide an improved, rigid bar take-off from such bus connections.

In carrying out the invention in one form, I provide a plurality of tubular buses, which are disposed in end-to-end relationship. Adjacent ends of the buses to be electrically and mechanically joined are cut in the form of steps which overlap and are of sufficient length to accommodate feeder bar take-offs therebetween. Each step is cut along a plane parallel to but offset from the axis of the tube such that less than half the original cross-sectional area remains. For purposes of standardization and interchangeability the offset is preferably the same amount in each case regardless of tube diameter, and sufficient to accommodate retaining plates plus take-offs or filler plates as required. The tubular buses, take-offs and retaining plates are clamped together by means of bolts.

For a better understanding of the invention, reference may be had to the following specification, taken in connection with the accompanying drawings, in which like characters refer to similar parts throughout the several views and wherein.

Figure 1:
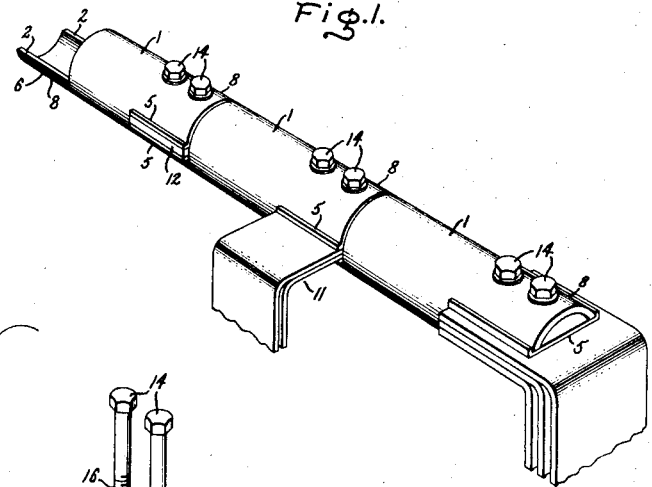
Fig. 1 is a perspective view of a section of tubular bus showing one end stepped, a connection using filler plates, a side feeder bar take-off, and an end feeder bar take-off.
Figure 3:
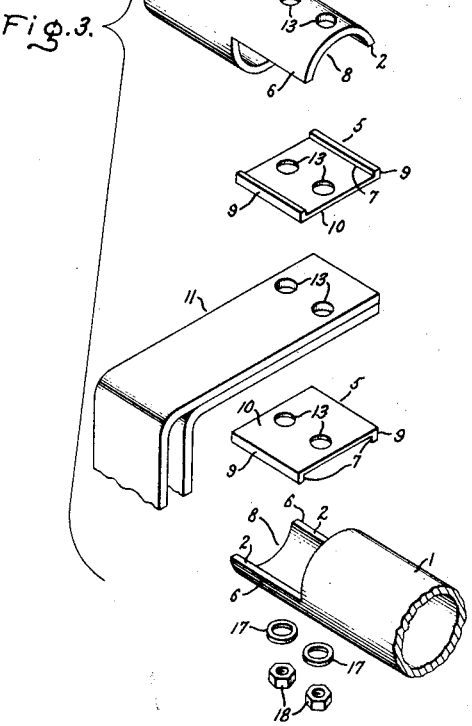
Fig. 3 is an exploded perspective view of a connection between two adjacent tubular buses with a side feeder bar take-off.

Referring now to Figures 1 and 3 of the drawing, there is shown a plurality of tubular, or generally cylindrical, bus sections 1 disposed in generally axially aligned end-to-end relationship with a stepped portion 8 on one tube end overlapping a similar step on an adjacent tube end. Each step 8 is designed to receive a retaining plate 5, and between a pair of such plates there is sandwiched a bus take-off 11 or filler plate 12 the whole being clamped together by means of bolts 14 passing through the tubes, plates and take-off. A stepped portion 8 on one tube cooperates with a similar portion on another tube through their respective retaining plates 5 to provide a rigid joint and also a bus take-off if desired. The tubular bus sections, retaining plates, bus take-offs and filler plates are composed of copper or other material of high electrical and thermal conductivity.

A step 8 is formed by cutting inward from an end of the tube along a plane parallel to the axis thereof and along another plane approximately perpendicular to the axis whereby the two axial surfaces 2 shown in Figures 1 and 3 become exposed. If adjoining tubes are to be aligned axially, more than half the cross-section of each must be removed in forming a step in order to accommodate a pair of retaining plates 5 and a bus take-off 11. If the tubes are not aligned axially, i.e., axes parallel, then a lesser amount of tubing is removed in forming a stepped portion.

The retaining plate 5 has a flat central portion placed against the two surfaces 2 on a tube, and two flanges 9 whose inner surfaces 7 overlap the outer surface of the tube along the outside edges 6 of surfaces 2. The purpose of plates 5 is to prevent radial spreading of stepped portions 8 when the joint is clamped together, the flanges 9 restraining such movement. In a joint, plates 5 are spaced back to back with a bus take-off 11 sandwiched between them, and they are assembled in conjunction with stepped portions 8 such that the outer surfaces 10 face each other, with flanges 9 facing outwards and fitting against the outer edges 6 of surfaces 2.

Figure 2:
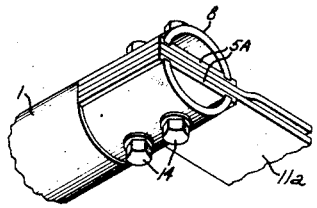
Fig. 2 is a perspective view of the clamping section for a side feeder bar take-off at the end of a tubular bus section showing an alternative form of retaining plate.
Figure 4:
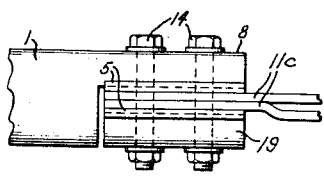
Fig. 4 is a side view of a tubular bus termination with an end feeder bar take-off.

A bus take-off consists of one or more elongated bars of rectangular cross-section stacked flatwise at the joint as clearly shown in Figures 1, 2 and 4. Although the drawings show only one side take-off at a joint, it is believed to be apparent that a joint can have a take-off at either side.

To provide means for clamping, one or more holes 13 of slightly larger diameter than bolts 14, are drilled through stepped portions 8, retaining plates 5, bar take-offs 11 or filler plates 12, corresponding holes in all components being in alignment, preferably passing through the longitudinal axis of the tubular conductors 1, and generally perpendicular to facing surfaces 10.

To clamp the components together, bolts 14 are inserted in holes 13, with washers 15 placed between the bolt heads and the outside surface of one stepped portion 8, and with the threaded bolt ends 16 protruding through the diametrically opposite holes 13 of the complementary stepped portion 8 a sufficient amount to accommodate washers 17 and nuts 18, which are tightened on bolts 14 to obtain the desired joint pressure.

In Fig. 4 is illustrated the case of an end bar take-off. In this instance, a partial tubular section 19, which may be salvaged and cut down to proper size from the material cut away to form stepped portion 8, is used to complete the clamping section. The bus take-off, designated 11c, is located between the respective retaining plates 5 on the tubular section 19 and the stepped portion 8, and the bolts 14 clamp all of the components together in a manner corresponding to that shown in Fig. 3.

Fig. 2 also illustrates the case of an end bus take-off, and in particular an alternative form of retaining plate 5A wherein axially exposed surfaces 2 fit into parallel grooves cut in one side of each plate 5A. In this particular arrangement the surfaces 2 of stepped portion 8 are restrained from movement along the face of plate 5A either inward or outward. If the stepped portion were formed with more tubing remaining than removed, movement of the tube wall along the plate may tend to be inward rather than outward. The bus take-off, designated 11a, is clamped between the retaining plates 5A by bolts 14 in a manner corresponding to that shown in Fig. 3.

It should be noted that it is not necessary for adjacent tubular conductors 1 to be of the same diameter or wall thickness. Also, since in the preferred form of the invention, bolts 14, washers 15 and 17, and nuts 18 are aligned substantially through the longitudinal axis of tubular conductors 1, they may be composed of steel or other magnetic material. It will also be evident that tubular insulation may be slipped over the tubular conductors 1, between joints and bus take-offs before assembly; and that after assembly, such joints and bus take-offs may be easily insulated in a manner well known in the art.

While I have shown and described particular embodiments of my invention, it will be obvious to those skilled in the art that various changes and modifications may be made without departing from the invention in its broader aspects, and I, therefore, intend in the appended claims to cover all such changes and modifications as fall within the true spirit and scope of the invention.

What I claim as new and desire to secure by Letters Patent of the United States is:

1. In an electrical bus system, a first tubular bus having a partial cylindrical portion cut away from one end thereof along a plane substantially parallel to the axis of the bus to provide two exposed surfaces on said first bus extending axially inward from the end of said first bus; a first retaining plate having a central flat portion placed against the exposed surfaces of said first bus; a second tubular bus having a cut away portion similar to that of the first bus for providing two exposed surfaces on said second bus extending axially inward from an end of said second bus; a second retaining plate having a central flat portion placed against the exposed surfaces of said second bus; said tubular buses being positioned with their axes substantially parallel and with their respective retaining plates spaced back to back; at least one bus take-off having a portion thereof sandwiched between said retaining plates, each take-off consisting of at least one elongated bar substantially rectangular in cross-section; bolt means passing through said tubular buses, plates, and bus take-off for clamping them together; and flange means on said retaining plates for restraining movement of said exposed surfaces along said plates due to clamping forces applied to the buses by the bolt means.

2. In an electrical bus system, a first tubular bus having a partial-cylindrical portion cut away from one end thereof along a plane substantially parallel to the axis of the bus to provide two exposed surfaces on said first bus extending axially inward from the end of said first bus; a first retaining plate having a central flat portion placed against the exposed surfaces of said first bus; flanges on said first plate overlapping the outer walls of said first bus along the outside edges of said exposed surfaces thereon; a second tubular bus having a cut away portion similar to that of the first bus for providing two exposed surfaces on said second bus extending axially inward from an end of said second bus; a second retaining plate having a central flat portion placed against the exposed surfaces of said second bus; flanges on said second plate overlapping the outer walls of said second bus along the outside edges of said exposed surfaces thereon; said buses being aligned axially and having their respective retaining plates spaced back to back; at least one bus take-off having a portion thereof sandwiched between said retaining plates, each take-off consisting of at least one elongated bar substantially rectangular in cross-section; and bolt means passing through said tubular buses, plates and bus take-off for clamping them together; said flanges on the retaining plates preventing spreading of said exposed surfaces along the plane of said retaining plates due to clamping forces applied to the buses by the bolt means.

3. In an electrical bus system, a tubular bus comprising a first partial cylindrical portion disposed at one end thereof and providing two exposed surfaces on said bus extending axially inward from the end of the bus in a plane substantially parallel to the axis of the bus; a first retaining plate having a central flat portion placed against the exposed surfaces of said first bus; a second partial cylindrical portion of tubular bus having two exposed axial surfaces extending along the length thereof; a second retaining plate having a central flat portion placed against the exposed surfaces of said second bus portion; said bus and said second bus portion being positioned with their axes substantially parallel and with their respective retaining plates spaced back to back; conductive plate structure sandwiched between said retaining plates and engaging the back of said retaining plates; bolt means passing through said tubular bus, retaining plates, conductive plate structure and second bus portion for clamping them together; and flange means on said retaining plates for restraining movement of said exposed surfaces along said plates due to clamping forces applied to the bus and bus portion by the bolt means.

4. In an electrical bus system, a tubular bus having a partial cylindrical portion cut away from one end thereof along a plane substantially parallel to the axis of the bus to provide two exposed surfaces extending axially inward from the end of the bus; a first retaining plate having a central flat portion placed against the exposed surfaces of said bus, flanges on said first plate overlapping the outer walls of said first bus along the outside edges of said surfaces thereon; a partial cylindrical member having two exposed axial surfaces extending along the length thereof; a second retaining plate having a central flat portion placed against the exposed surfaces of said partial cylindrical member, flanges on said second plate overlapping the outer walls of said partial cylindrical member along the outside edges of said surfaces thereon; said bus and said partial cylindrical member being aligned axially and having their respective retaining plates spaced back to back; at least one bus take-off having a portion thereof sandwiched between said retaining plates, each take-off comprising at least one elongated bar substantially rectangular in cross-section; and bolt means passing through said tubular bus, retaining plates, bus take-off and partial cylindrical member for clamping them together, said flanges on the retaining plates preventing spreading of said exposed surfaces along the plane of said retaining plates due to clamping forces applied to the bus and partial cylindrical member by the bolt means.

5. An electrical bus system as defined in claim 2 wherein said bolt means comprises bolts of magnetic material passing through the axes of said tubular buses.

6. An electrical bus system as defined in claim 3 wherein said bolt means comprises bolts of magnetic material passing through the axis of said tubular bus and the axis of said second partial cylindrical portion.

No references cited.